United States Patent [19]

Alvarez

[11] Patent Number: 4,658,591
[45] Date of Patent: Apr. 21, 1987

[54] APPARATUS AND PROCESS FOR THE FLUIDIZATION AND COMBUSTION OF FUELS

[75] Inventor: Antonio J. Alvarez, Piedmont, S.C.

[73] Assignee: Technical Equipment Systems, Inc., New City, N.Y.

[21] Appl. No.: 770,301

[22] Filed: Aug. 27, 1985

[51] Int. Cl.⁴ .......................... F23G 5/04; F23B 7/00
[52] U.S. Cl. ...................................... 60/670; 110/224; 110/234
[58] Field of Search .................. 60/670; 110/224, 234, 110/246

[56] References Cited

U.S. PATENT DOCUMENTS

| | | | |
|---|---|---|---|
| 2,274,780 | 3/1942 | Duerr et al. | 110/234 |
| 4,430,949 | 2/1984 | Ekenberg | 110/224 X |
| 4,437,418 | 3/1984 | Guillaume et al. | 110/234 X |

Primary Examiner—Allen M. Ostrager
Attorney, Agent, or Firm—Felfe & Lynch

[57] ABSTRACT

Disclosed is an apparatus and process for generation of thermal energy, and cogeneration which includes a variable speed rotating heat transfer apparatus for the fluidization and combustion of carbonaceous fuel. The apparatus has an integrally formed water cooled jacket and water cooled auger and is maintained at an inclination with respect to ground level. The apparatus and process allow for a wide range turndown ratio and is adapted to cause a multidirectional movement of the fuel to be combusted.

13 Claims, 3 Drawing Figures

APPARATUS AND PROCESS FOR THE FLUIDIZATION AND COMBUSTION OF FUELS

BACKGROUND

Increased manufacturing activity has resulted in increased energy demand in various useable forms but the reserves of conventional energy producing resources have not proportionately increased. The abundance of certain energy yielding materials, such as coal, has had little impact on satisfying the increased demand because environmental and health considerations often limit or prohibit their use. Efficient and non-polluting energy generation is desirable.

One factor which can aid in meeting energy demands while minimizing environmental and health concerns is good control of the generating process. Prior art efforts to provide the necessary control have been less than satisfactory.

U.S. Pat. No. 4,009,667 to Tyer et al discloses an incinerator having a variable speed auger which continuously feeds refuse into and through the combustion chamber and a water filled ash receptacle. The auger incorporates an annular space between the water-cooled auger shaft and the auger flight, the flight decreasing in pitch from the feed inlet to the outlet. Cooling fluid flows in an annular space between a tube housed in the auger shaft and the auger shaft.

The auger shaft is eccentric to the longitudinal axis of the stationary horizontal combustion chamber which is fashioned with a manifold through which an inlet blower pushes combustion air into the chamber. A plurality of hot air distribution pipes extend into the chamber from the manifold.

The auger drive speed is controlled by Tyer et al as a function of the temperature at the exhaust end of the combustion chamber to regulate combustion of the refuse material. Entering combustion air can be controlled and preheated as a function of the temperature.

U.S. Pat. No. 3,822,651 to Harris et al discloses a water cooled inclined rotary kiln for waste disposal. The kiln's inner cylindrical surface is formed by a plurality of interconnecting cooling pipes. Fuel tumbles the length of the kiln from the higher feed end to the lower discharge end. The rate at which the burning material tumbles along the cylindrical surface is controlled by kiln rotation which may be as little as 1 rpm. Steam is removed in a steam drum.

U.S. Pat. No. 2,610,033 to Rietz describes a heat-exchange screw conveyor wherein the conveyor flight is adapted for the passage of heat exchange fluid therethrough. The stationary conveyor housing is jacketed and a heat transfer fluid circulates therethrough.

U.S. Pat. No. 47,792 to Brayton discloses an arrangement wherein a cylinder has inlet and outlet ports for the induction and eduction of steam therefrom and a middle exhaust or condenser port. The oscillating motion resulting from the movement of the piston within the cylinder is transmitted by piston rod E to a crank F. Baum, U.S. Pat. No. 339,132 discloses use of a three port slide valve by which fluid is introduced and removed and the resulting movement of the cylinder or piston transmitted to an engine. The trunions by which the cylinder is supported are hollow to allow for introduction and eduction of the steam. U.S. Pat. No. 1,536,166 discloses a two cylinder arrangement but shows use of the reciprocating cylinders in connection with an engine structure.

THE INVENTION

The present invention is in apparatus and a process for generation of thermal energy, and cogeneration and includes a variable speed rotating heat transfer apparatus for the fluidization and combustion of any carbonaceous fuel, including but not limited to, coal, wood, wood wastes, solid wastes, sewage, crude petroleum, kerosene, diesel oil, fuel oils, and natural gas.

Further, the apparatus and process described herein allows an infinite turn-down ratio to obtain a maximum to a minimum thermal output by means of varying the residence time of the combusting/fluidizing fuel/air mixture as a function of the speed of the main reactor assembly. It is also a very important feature of this apparatus that fluidization is accomplished in a minimum friction rotating field, which allows the gaseous and solid products of combustion to be in intimate contact with the heat and mass transfer area without affecting the component's integrity. The products of combustion can be fluidized and contacted with an amount of chemical reagent to neutralize harmful gaseous products of combustion such as chloride radicals, sulfur oxides, and sulfur compounds. Further, the system comprises an automatic flue gas temperature control which maintains the fluidization combustion temperatures within a range of 1450° F. to 1600° F., thus virtually eliminating formation of oxides of nitrogen, while maintaining the combustion efficiency.

The various features of novelty which characterize the invention are pointed out with particularity in the claims annexed to and forming a part of this specification. For a better understanding of the invention, its operating advantages and specific objects obtained by its use, reference should be had to the accompanying drawings and descriptive matter in which there is illustrated and described a preferred embodiment of the invention.

DESCRIPTION OF PREFERRED EMBODIMENT

Figure 1:
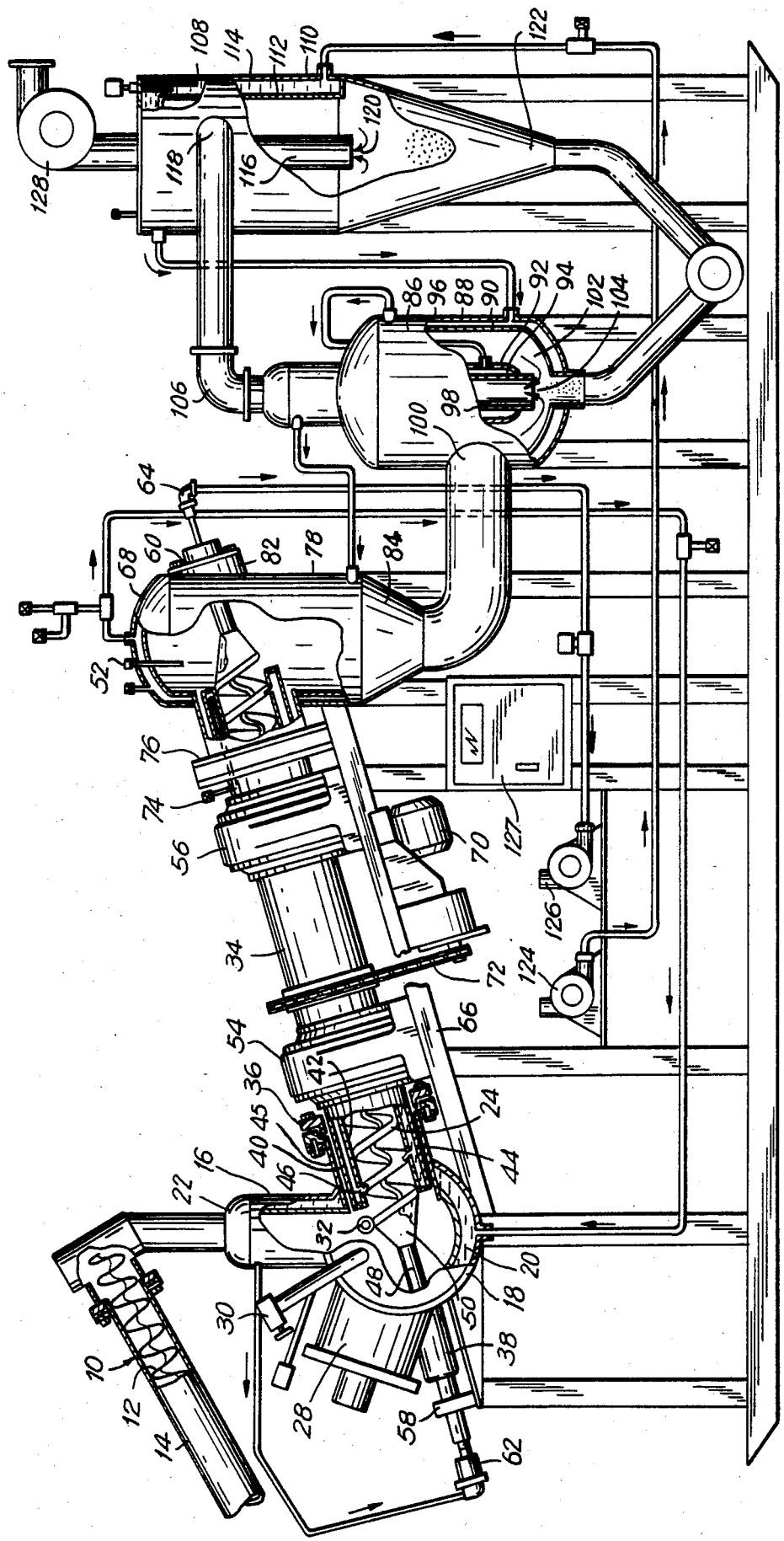
FIG. 1 is an elevation view of the system of the invention.

Referring to FIG. 1, fuel feed mechanism 10 is comprised of an auger 12 enclosed by, and welded to a tube 14. Auger 12 and tube 14 rotate at the same time and feed the fuel into pre-ignition assembly 16. Fuel feed mechanism 10 is adapted to supply fuel to the system at a variable speed as a function of the system's thermal load requirement as subsequently described.

Pre-ignition assembly 16 is comprised of a reactor 18, preferably provided with a water or liquid jacket 20. Reactor 18 has four flanged inlets in the form of liquid or water jacket tubes. Fuel, or fuel mixed with chemical reagent such as a limestone, is introduced in a variable amount depending on the thermal load of the system through inlet 22 which is perpendicular to the main cross section of the reactor. The fuel falls to the bottom of reactor 18 and about a liquid or water cooled hollow auger 24. The fuel is initially exposed to intense heat supplied by the ignitor subassembly 28 to initiate combustion of the fuel. The system acknowledges fuel ignition by means of monitoring the suction pressure at the combustion air inlet port 30. Fuel levels at the pre-ignition assembly are monitored and simultaneously controlled by an external nuclear densitometer 32, which continuously senses such fuel or fuel/reagent levels and, depending on thermal load requirements, instructs the fuel or fuel/reagent feed mechanism 10 to add more fuel or fuel/reagent if the fuel or fuel/reagent level is below a preset level. Once fuel ignition initiates combustion, the fuel or fuel/reagent mixture is continuously propelled through the chamber 34 by means of the liquid or water cooled auger 24 and combustion air as will be subsequently described.

Chamber 34 is connected to pre-ignition assembly 16 by a flange/fire box seal sub-assembly 36, comprised of a rotary graphite rope seal compressed between two flanges. The auger sub-assembly 24 is supported at one end by inlet 38 of pre-ignition assembly 16.

Initial heat of combustion and radiated heat is continuously transferred to a liquid fluid or water flowing through cooling jacket 20 of reactor 18. The cooling fluid is circulated through remaining components of the system as will be subsequently described.

Chamber 34 is formed from two concentric tubes 40 and 42 sealed at both ends and forming a liquid or water jacket 44. Tubes 40 and 42 extend beyond chamber 34 and terminate at a sleeve section 45 of the pre-ignition assembly 16. The sleeve is adapted for connection with the chamber 34. Water jacket 44 is in fluid communication with the hollow auger sub-assembly 24 by means of channels 46 (one shown) on the outer periphery of the auger, thus allowing the cooling fluid liquid or water, to flow through jacket 44 and through hollow auger 24, to recover thermal energy in the chamber. The cooling fluid liquid or water is continuously introduced into the hollow auger 24 and subsequently to the jacket 44 by a hollow shaft 48 which is coupled to auger 24 by a funnel section 50. Funnel 50 is fashioned with a semi-spiral end shape at the largest cross-section and allows the hollow auger 24 to be formed in a shaft-less arrangement. Thus the combusting fuel or or fuel/reagent air mixture can be continuously propelled in a forward motion up and through chamber 34 counter-currently with respect to the rotation of auger 24. This results in an upward and partial downward flow of the fuel or fuel/reagent as the same travels up the inclined plane of chamber 34. This upward and partial downward movement or mass flow of the fuel or reagent/fuel is proportional to the speed of rotation of chamber 34 and to the inclination of the chamber's longitudinal axis (A). Another factor contributing to the back mixing is the shape of the screw. Chamber 34 exhibits the best performance characteristics when its longitudinal axis is at an angle of approximately 17°±0.5° with respect to the horizontal. The angle of inclination can range from 10° to 17.5° but under these conditions the ratio of advance to roll bed is about 60:40.

The speed of rotation of the chamber 34 is proportional to the combustion temperature of the fuel or reagent/fuel/-air mixture as monitored by temperature probe 52. The rotational speed increases with temperature rise and decreases proportionally with a temperature reduction. This results in the residence time of the fuel or reagent/fuel air mixture increasing or decreasing in an inverse proportion with respect to the fuel or reagent/fuel air mixture temperature, and to the thermal load of the system, since the greater the thermal requirement the lower the temperature and the greater the need for the combusting fuel or fuel/reagent air mixture or combustion products to be in heat exchange contact for an increased period of time.

Air flow in the chamber 34 can be adjusted depending on the ratio of CO to $O_2$. This ratio is measured by CO and $O_2$ at the chamber exhaust. The monitor comparing these measurements to present ranges can proportionately open or close a valve for admitting air into the system. The The resistance time of the fuel within the chamber is thus controlled.

The fuel flow pattern of chamber 34 follows a multi-directional trajectory. The combusting fuel or reagent/fuel mixture moves in a spiral path from one side of the flight of the auger 24 to the opposite side and up and down along inner surface of chamber 34. This multi-directional path enables a part in the fuel or fuel/reagent mixture to fall back out or mix with, and transfer heat to incoming fuel or mixture thus increasing the heat transfer rate to the fluid in jacket 44. The residence time of the combusting mixture is thus increased.

Auger 24 is supported by four bearings 54, 56, 58 and 60. Bearings 54 and 56 also support chamber 34 and the remaining two bearings 58 and 56 support the hollow shaft auger.

Liquid coolant or water is continuously introduced into and removed from the jacket 44 through rotary-water seals 62 and 64 respectively which are connected to conventional pipes. Bearing 58 is supported from the assembly 16 as well as rotary seal 62 and bearings 54 and 56 are supported from a main support frame 66, a member of which is preferably inclined at an angle of approximately 17°±0.5° with respect to ground level or the horizontal. Bearing 60 and rotary seal 64 can be supported from transition module/heat economizer 68.

Chamber 34 is rotated by a variable speed motor 70 connected thereto by a chain drive-sprocket gear sub-assembly 72. The motor 70 may be supported from the main support frame 66.

Chamber 34 can be constructed of carbon or stainless steel depending upon the application. However, any material meeting the service requirements and which can be suitably fabricated will suffice. The dimensions of chamber 34 depend upon the application and range from a few inches in diameter and length to many feet. Since the minimum thermal output to the maximum thermal output ratio (turn-down ratio) is dependent upon the speed of rotation at an angle of 17°±0.5° the same maximum thermal output can be accomplished by increasing the diameter and decreasing the length within a range of speeds or conversely by decreasing the diameter and increasing the length within a range of speeds, thus allowing the apparatus to be installed and operated as per pre-existing space limitations.

Chamber 34 is provided with a de-aerator bleed valve 74, to allow any air bubbles that may accumulate to be vented to the atmosphere thus preventing the accumulation of air pockets within the liquid/water jacket 44.

Chamber 34 connects with and/or penetrates transition module/heat economizer 68. Economizer 68 is provided with a fire-box seal assembly comprised of a graphite rope packing gland 76 compressed between two flanges.

Transition module/heat economizer 68 is formed of a cylindrical vessel 78 provided with a cooling jacket 80 through which liquid coolant or water flows, thus recovering additional heat not previously recovered. Module 68 can also provide an initial separation of the large particle size fly-ash from the flue gas from chamber 34.

Vessel 68 is also provided with an outlet sleeve 82 to support the hollow shaft of the auger 24, bearing 60 and the rotary seal 64. Vessel 68 is also provided with an outlet reducer/flange 84 for the flue gas, for a flanged connection to the inlet of the fly-ash separator 86.

The fly-ash separator 86 can also serve as a secondary heat recovery module and may be comprised of four concentric cylindrical sections, which respectively form two liquid or water jackets 96 and 98 between the two larger cylinders 88 and 90 and between the two smaller diameters 92 and 94.

Flue gas exits vessel 68, and flows through inlet 100 into the annular space 102 in a vortex pattern about cylinder 92. The gas exits port 104 at an increased velocity, thus allowing, by means of a sudden gas trajectory and velocity change, the separation of fly-ash particles therefrom. Concurrently, heat is removed and transferred from the flue gas to the liquid or water coolant, thus recovering an additional amount of waste heat not previously recovered. The fly-ash is subsequently removed by a conventional pneumatic conveyor (not shown).

The flue gas is discharged from the separator 86 by means of discharge flange/elbow 106 and is directed to a high efficiency liquid or water cooled cyclone 108 for further separation of and/or removal of finer fly-ash particles.

High efficiency cylone 108 may be formed from three concentric cylinders 110, 112 and 116. Cylinders 110 and 112 form a liquid or water jacket 114 through which liquid coolant or water continuously flows, thus recovering any waste heat not previously recovered.

The flue gas enters cyclone 108 through tangential inlet 118 at a velocity of approximately 105 to 145 feet per second and circulates around cylinder 116 at a velocity within a range of 7 to 10 feet per second. The gas exits through port 120 at a velocity within a range of 60 to 75 feet per second. Small particle-size fly-ash is subsequently removed through conical discharge end 122 by a conventional pneumatic fly-ash removal system (not shown) or by a screw conveyor (not shown), depending upon the application.

Liquid or water pumps 124 and 126, which are preferably centrifugal pumps, pump the cooling fluid or water, through the system. The cooling fluid may be circulated through the entire system in a counter-current fashion. The cooling fluid may be first pumped via pump 124 to cyclone 108 then to the fly-ash separator 86, then to the transition module/heat economizer 68 to the pre-ignition sub-assembly 16, and to the jacket 44 and auger 24 where the fluid exits through rotary seal 64. The exit point at the rotary seal is the point where the cooling fluid has the highest temperature in the system.

Control panel 127, controls all the functions of the system as described above.

Exhaust blower 128, provides negative draft for the system while delivering combustion air from inlet air valve 30 through the pre-ignition assembly 16, dynatube 34, transition module 68, fly-ash separator 86, and high efficiency cyclone 108 to the stack (not shown).

COGENERATION

The thermal energy transferred to the fluid in the system results in pressurized heated fluid such as hot water or steam. Steam can be separated out in a steam drum (not shown). The pressurized fluid can be utilized to generate mechanical energy. The pressure of the fluid can be measured in the jacket 44 and compared to a present pressure range in a pressure controller (not shown) which can control the fuel feed into the pre-ignition assembly. Depending on these measurements the fuel feed may be stopped or continued.

Figure 2:
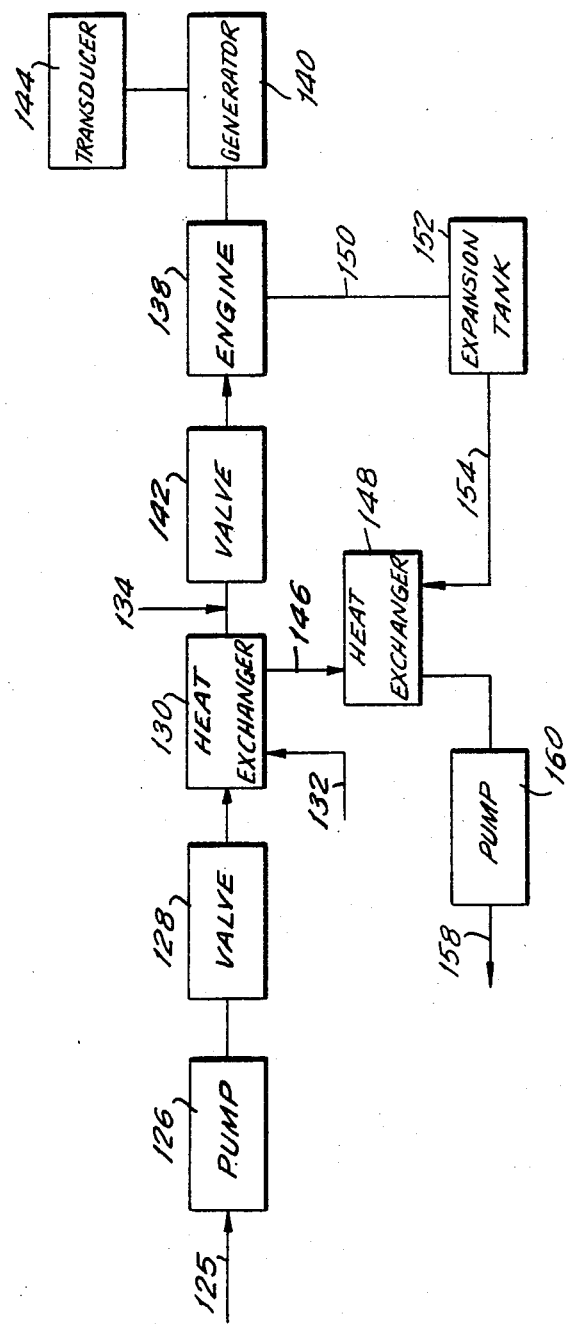
FIG. 2 schematically depicts the fluid circuit for the heated fluid from the arrangement of FIG. 1.

Referring to FIG. 2, the heated fluid 125 from the system rotary seal 64, which contains the hottest fluid in the system, is pumped via pump 126 into heat exchanger 130 at a metered rate via valve 128. Heat exchanger 130 may be a conventional shell and tube type heat exchanger. A heat transfer fluid, such as pressurized condensed freon, is also introduced into exchanger 130 via line 132 wherein a portion of the heat from the hot fluid is exchanged with the condensed, liquified freon being continuously pumped by a freon pump (not shown), resulting in a complete vaporization of the freon. The pressurized and vaporized freon exits the heat exchanger by means of line 134.

The vaporized freon is continuously introduced into an expansion-type Rankine engine 138, mechanically linked to generator 140 through electrically operated valve 142. Valve 142 controls the flow of the vaporized freon as a function of the electric generator power output in order to maintain the frequency as per the output of the frequency transducer 144 as subsequently described. The cooled fluid 146 may then be fed into a heat exchanger/condenser 148 and processed as described below.

The expended freon 150, after undergoing isentropic expansion throughout Rankine engine 138 and performing mechanical work by means of activating generator 140 as result of the reciprocating mechanical motion of the Rankine engine, is continuously introduced into tank 152 wherein the freon is expanded. Tank 152 buffers the flow as will be subsequently described.

The expanded freon (mixture of liquid and vapor) is fed into to the lower stage of heat exchanger 148 via line 154, where it undergoes complete condensation.

The reclaimed heat resulting from the freon condensation is continuously recovered by the return water effluent 146 from heat exchanger 148 and subsequently recycled back to the chamber 34 by means of line 158, pump 160, and line 162 to decrease the system's overall energy consumption.

Figure 3:
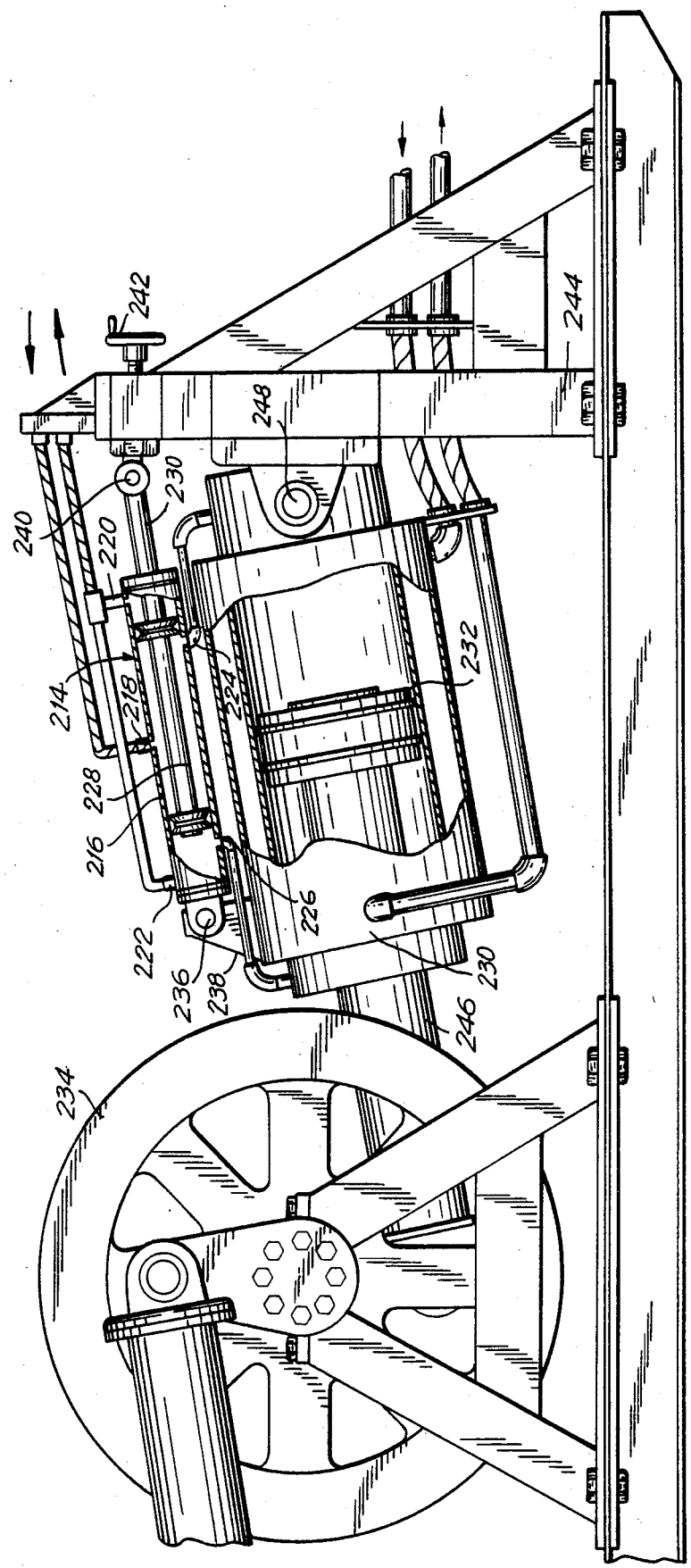
FIG. 3 illustrates a cogeneration arrangement.

The engine 138 will be more fully described by reference to FIG. 3. Reciprocating control valve 214 has a cylinder 216 with an inlet 218, two common outlets 220 and 222, and two gas outlet/inlet ports 224 and 226. Cylinder 216 houses a double piston 228 connected with a timing rod mechanism 230. Reciprocating control valve 214 changes the direction of the fluid to the inlet of the power piston and outlet of the power piston in the following manner: As the double piston 228 moves between gas outlet/inlet ports 224 and 226, the pressurized fluid which enters the cylinder through inlet 218 exhausts through either 224 or 226 into cylinder 230 housing reciprocating piston 232. When the motion and trajectory of piston 232 travels the equivalent of 180°, based on the rotation of fly wheel 234, control valve 214 is positioned such that one of the gas outlet/inlet ports 224 or 226 is blocked. This allows the expanded exhaust gas from piston 228 to exit. Concurrently a fresh charge of gas is injected into the opposite end of the cylinder, thus allowing the reciprocating motion of valve 214 to be in face with piston 232.

Control valve 214 is linked in operative relationship to cylinder 230 by bearing 236 which is structurally supported by plate 238 which is also physically connected to cylinder 230. Valve 214 is also supported by bearing 240 and a timing rod mechanism 242 supported by structure 244 which is physically connected to cylinder 230 at the same slope or inclination. Thus any vertical movement of cylinder 230 and piston 232 is translated into a vector movement of control valve 214.

The reciprocating motion of power piston 232 results in movement of piston rod assembly 246, which is mechanically linked to fly wheel 234 by a wrist pin bearing and wrist pin counter weight (not shown). Cylinder 230 and piston 232 are also structurally supported from supporting structure 244 through bearing 248.

The timing of piston 232 cycle and valve 214 is accomplished by means of increasing or decreasing the thrust length of the timing rod mechanism 242. This allows the power output of the unit to be changed within a range equal to 10:1 turn-down ratio, since the torque is maintained as a function of fluid flow, pressure, temperature, resulting isentrophic expansion of the hot gaseous fluid, and speed of rotation of the fly wheel 234.

The main function of fly wheel 234 is to act as a power storage device which is continuously transferred to the same through its shaft (not shown) directly linked into piston 232 by assembly 246. The resulting torque applied into the shaft is spread through the greater surface area of the fly wheel which is subsequently transferred to any type of electric power generator by means of suitable gear ratios to convert the high torque into higher rpm's capable of transferring low torque and high horse power to the generator.

Expansion tank 152 provides a transient storage vehicle and allows for further expansion of the isentropically expanded fluid, a lower pressure being exhausted from engine 138, thus allowing the system to be connected to a stable buffer in order to prevent power upsets and surges during those periods of time in which the demand of electric power can be increased by a magnitude of 10%-100%. Expansion tank 152 is formed with a cooling jacket (not shown) through which a cooling fluid recirculates. This allows the pressure of the expanded gaseous fluid to be maintained below atmospheric at all times by means of lowering the temperature of the gas which insures the thermal stability of the system. The expanded gaseous fluid from expansion tank 152 is continuously recycled through a pump back to the heat source that originally provided the hot gaseous fluid.

EXAMPLE 1

462 lbs per hour of coal of the approximate following percentage analysis:

|  |  |
|---|---|
| Carbon | 78.84 |
| Hydrogen | 4.92 |
| Oxygen | 5.12 |
| Nitrogen | 00.00 |
| Sulfur | .98 |
| Chlorine | 00.00 |
| $H_2O$ | 3.05 |
| Ash | 7.09 | and having a nominal heat value of 13,500 BTU/lb is metered into the preignition assembly 16 where it is preheated to a temperature of 950° F. The coal has a particle size range of 0.375 inches to 0.50 inches.

The combustor has an outer diameter of 52 inches and is 144 inches long. The water jacket inner diameter is 48 inches resulting in an inside heat transfer area of approximately 151 square feet. The auger has a helical screw diameter of 47.625 inches and is designed so that 5094 lb of $H_2O$ per hour can pass therethrough at plant water pressure. The combustor tube is rotated at a range of 1-10 rpm by a 15 hp variable speed motor. Combustion air is introduced into the combustor tube at a rate of 1392 acfm at 60° F., resulting in an actual air velocity of 9.23 fpm through the combustor. The auger rotates at a range of 1-10 rpm. The average temperature in the combustor, is 1600° F. Water at 185° F. is fed into the cooling jacket at 10.2 gpm at 200 psig to produce 5094 lb per hour of steam at 200 psig and 400° F. with 30° F. superheat. The average residence time of the fuel is 1.42 seconds.

The exhaust gas leaves the combustor at 800° F. and is introduced into jacket economizer having an outer diameter of 56 inches, height of 84 inches and a jacket inner diameter of 56 inches giving a heat transfer surface of 95 ft.$^2$. The exhaust gas then flows into a fly ash separator of 4 concentric cylinders forming two water jackets. The outer diameters of the vessel and inner cylindrical surfaces are 24 and 18 respectively. The separator has an overall height of 48 inches. In the separator, the larger particles fall out by gravity. The exhaust gas is then introduced to a high efficiency cyclone where the finer particles are removed in a centrifugal process. The cyclone has an overall height of 96 inches, outer diameter of 24 inches, cylinder height of 36 inches and cone height of 60 inches. The inlet is dimensioned to give an inlet velocity of 50 fp sec. The exhaust gas composition leaving the cyclone/blower exhaust is lbs/lb of feed: water=0.645, $CO_2$=2.843 nitrogen: 10.34, $SO_2$=0.01958, HCl, Oxygen=0.725/4

The steam is introduced into a reciprocating control valve having an outer cylinder diameter of 3 inches and a double piston with 0.7854 in$^2$ of surface area. The control valve dispenses heated fluid to a piston having a diameter of 8 inches a stroke length of 1.5 feet and piston area of 1.047 ft.$^2$. The piston is connected by a 2 inch arm to a fly wheel of 60 inches diameter. The power output is 1000 H.P.

EXAMPLE 2

The apparatus and arrangement of Example 1 is utilized but the demand is one half of that in Example 1. To utilize the setup, the fuel feed is now 2500 lbs per hour and the combustor tube rotates at 1-5 rpm. Cooling liquid flows through the tube jacket at 5.1 gpm and combustion air is introduced at 696 acfm at 60° F.

The terms and expressions which have been employed are used as terms of description and not of limitation, and there is no intention in the use of such terms and expressions of excluding any equivalents of the features shown and described or portions thereof, it being recognized that various modifications are possible within the scope of the invention.

I claim:

1. Apparatus for combustion of fuel comprising:
   a preignition assembly having means to receive the fuel;
   a jacketed combustion chamber attached to said preignition assembly;

a hollow shaftless auger extending from said preignition assembly to and through the combustion chamber for feeding said fuel thereto, said combustion chamber and auger being adapted for rotation about an axis which is inclined with respect to a horizontal;

inlet means for the introduction of combustion air into said combustion chamber and exhaust means for gaseous products of combustion to leave said chamber;

variable speed drive means engaged for rotation of said combustion chamber about said inclined axis; and means for fluidizing said fuel in said combustion chamber.

2. The apparatus of claim 1 wherein the auger extends from a first funnel shaped section to a second funnel shaped section.

3. The apparatus of claim 2 wherein the auger extends into an economizer.

4. The apparatus of claim 1 further comprising means responsive to thermal load requirements to control the fuel level in said preignition assembly.

5. The apparatus of claim 1 wherein said auger is in fluid communication with said heat transfer jacket.

6. A method for combustion of fuel comprising:
introducing the fuel into a preignition assembly to initiate combustion;
subsequently introducing the fuel into a combustion chamber surrounded by a heat transfer jacket; said chamber having a shaftless auger extending therethrough; and
rotating said combustion chamber and auger about an axis inclined with respect to the horizontal to cause multi-directional mixing of the fuel.

7. The method of claim 6 further comprising:
removing heat of combustion from said chamber through said jacket.

8. The method of claim 6 wherein fuel feed is regulated in response to thermal requirements.

9. The method of claim 7 wherein the speed of rotation is regulated in response to thermal requirements.

10. A method of generating energy comprising:
introducing fuel into a preignition assembly;
passing the fuel into a jacketed combustion chamber having an auger extending therethrough;
rotating said combustion chamber and auger about an axis inclined with respect to the horizontal to cause multidirectional movement of the fuel for thorough mixing and combustion;
removing heat of combustion from said chamber by means of a first cooling fluid circulating through said jacket;
heating a second fluid by transfer of thermal energy from the first fluid to said second fluid, introducing said second fluid into conversion means for converting thermal energy to mechanical and/or electrical energy.

11. The method of claim 10 wherein the conversion means includes control means to regulate a power piston cylinder, means for imparting motion of the piston to an energy storage means; said means being operatively engaged to means for storing and/or converting mechanical energy into another energy form.

12. The method of claim 10 wherein the vaporized fluid leaves the thermal energy conversion means and is expanded and cooled to form a condensate.

13. The method of claim 11 wherein the condensate imparts heat to a fluid which is recycled to the jacket of the combustion chamber.

* * * * *